United States Patent
Zhang et al.

(10) Patent No.: US 10,819,474 B2
(45) Date of Patent: Oct. 27, 2020

(54) RESOURCE SCHEDULING AND ALLOCATION METHOD AND APPARATUS

(71) Applicant: HUAWEI TECHNOLOGIES CO., LTD., Shenzhen, Guangdong (CN)

(72) Inventors: Yi Zhang, Shanghai (CN); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/129,907

(22) Filed: Sep. 13, 2018

(65) Prior Publication Data

US 2019/0013903 A1  Jan. 10, 2019

Related U.S. Application Data

(63) Continuation of application No. PCT/CN2017/075485, filed on Mar. 2, 2017.

(30) Foreign Application Priority Data

Mar. 14, 2016  (CN) .......................... 2016 1 0143758

(51) Int. Cl.
*H04L 1/18* (2006.01)
*H04W 72/04* (2009.01)
(Continued)

(52) U.S. Cl.
CPC .............. *H04L 1/1812* (2013.01); *H04L 1/08* (2013.01); *H04L 1/1854* (2013.01);
(Continued)

(58) Field of Classification Search
CPC ....... H04L 1/08; H04L 1/1812; H04L 1/1854; H04L 1/1887; H04L 5/0053;
(Continued)

(56) References Cited

U.S. PATENT DOCUMENTS 9,100,981 B2 *  8/2015  Wengerter ............ H04L 1/0026
9,451,554 B1 *  9/2016  Singh .................. H04W 52/146
(Continued)

FOREIGN PATENT DOCUMENTS

CN          1909440 A      2/2007
CN          101098188 A    1/2008
(Continued)

OTHER PUBLICATIONS

International Search Report, dated Jun. 2, 2017, in International Application No. PCT/CN2017/075485 (4 pp.)
(Continued)

*Primary Examiner* — Benjamin H Elliott, IV
(74) *Attorney, Agent, or Firm* — Slater Matsil, LLP

(57) ABSTRACT

This application relates to the mobile communications field, and in particular, to an air interface resource scheduling and allocation technology in the wireless communications field. In a resource scheduling and allocation method, a network device allocates, by using a downlink control information, an air interface resource used for N data transmissions to same user equipment, the downlink control information includes information about the air interface resource used for the N data transmissions, and N is an integer greater than 1.

19 Claims, 5 Drawing Sheets

(51) Int. Cl.
   *H04L 1/08* (2006.01)
   *H04L 5/00* (2006.01)
(52) U.S. Cl.
   CPC .......... *H04L 1/1887* (2013.01); *H04L 5/0053* (2013.01); *H04L 5/0055* (2013.01); *H04L 5/0082* (2013.01); *H04W 72/04* (2013.01); *H04W 72/042* (2013.01); *H04W 72/0453* (2013.01)
(58) Field of Classification Search
   CPC .... H04L 5/0055; H04L 5/0082; H04W 72/04; H04W 72/042; H04W 72/0453
   See application file for complete search history.

(56) References Cited

U.S. PATENT DOCUMENTS

| | | | | |
|---|---|---|---|---|
| 9,655,127 | B1* | 5/2017 | Srinivas | H04W 72/0486 |
| 2010/0054198 | A1* | 3/2010 | Sung | H04L 5/0037 |
| | | | | 370/329 |
| 2010/0309870 | A1* | 12/2010 | Wengerter | H04L 1/1893 |
| | | | | 370/329 |
| 2014/0321382 | A1* | 10/2014 | Guan | H04W 72/1289 |
| | | | | 370/329 |
| 2015/0237644 | A1* | 8/2015 | Golitschek Edler von Elbwart | H04B 7/2656 |
| | | | | 370/329 |
| 2015/0296493 | A1* | 10/2015 | Wengerter | H04L 1/0026 |
| | | | | 370/336 |
| 2015/0334683 | A1* | 11/2015 | Guo | H04W 72/042 |
| | | | | 370/329 |
| 2016/0212761 | A1* | 7/2016 | Li | H04L 5/14 |
| 2016/0323084 | A1* | 11/2016 | Golitschek Edler von Elbwart | H04L 1/0026 |
| 2017/0078126 | A1* | 3/2017 | Einhaus | H04W 72/042 |
| 2017/0134935 | A1 | 5/2017 | Wei | |
| 2017/0208583 | A1* | 7/2017 | Jiang | H04W 72/00 |
| 2017/0215177 | A1* | 7/2017 | Wengerter | H04L 1/0026 |
| 2017/0295584 | A1* | 10/2017 | Uchino | H04L 1/1819 |
| 2017/0353965 | A1* | 12/2017 | Zhang | H04W 72/0413 |
| 2018/0309496 | A1* | 10/2018 | Lee | H04B 7/0417 |
| 2019/0013903 | A1* | 1/2019 | Zhang | H04L 5/0055 |

FOREIGN PATENT DOCUMENTS

| | | |
|---|---|---|
| CN | 101159975 A | 4/2008 |
| CN | 101507201 A | 8/2009 |
| CN | 103384193 A | 11/2013 |
| CN | 105338518 A | 2/2016 |
| EP | 2635082 A1 | 9/2013 |
| JP | 2015513848 A | 5/2015 |
| WO | 2008024890 A2 | 2/2008 |
| WO | 2015047145 A1 | 4/2015 |

OTHER PUBLICATIONS

Written Opinion of the International Searching Authority, dated Jun. 2, 2017 in International Application No. PCT/CN2017/075485 (7 pp.)

Samsung, "WF on Proposals for DL Control Signaling for Rel-13 MTC," 3GPP TSG-RAN WG1 Meeting #82bis, R1-156330, Malmo, Sweden, Oct. 5-9, 2015, 11 pages.

Extended European Search Report, dated Jan. 7, 2019, in European Application No. 17765723.6 (8 pp.)

* cited by examiner

RESOURCE SCHEDULING AND ALLOCATION METHOD AND APPARATUS

CROSS-REFERENCE TO RELATED APPLICATIONS

This application is a continuation of International Application No. PCT/CN2017/075485, filed on Mar. 2, 2017, which claims priority to Chinese Patent Application No. 201610143758.X, filed on Mar. 14, 2016. All of the aforementioned patent applications are hereby incorporated by reference in their entireties.

TECHNICAL FIELD

This application relates to the mobile communications field, and in particular, to an air interface resource scheduling and allocation technology in the wireless communications field.

BACKGROUND

International Telecommunication Union (ITU) defines three main application scenarios of the 5th Generation mobile communications (5G): enhanced mobile broadband, ultra-reliable and low latency communications, and massive machine type communications. The ultra-reliable and low latency communications scenario includes services, such as industrial production wireless control and a remote medicine surgery, that have strict requirements on throughput, a latency, reliability, resource availability, and the like. For a service in such a scenario, because an expected latency is very low (a lowest latency reaches 1 ms), an available resource needs to be rapidly scheduled and configured, and a reliable data transmission also needs to be ensured.

In an existing wireless communications system, using an LTE (Long Term Evolution) system as an example, a data transmit end and a data receive end usually trigger a data retransmission by using a plurality of hybrid automatic repeat request (HARQ) processes until data is correctly received or a maximum quantity limit of retransmissions is reached, thereby ensuring data transmission reliability. It may be understood that a plurality of HARQ retransmissions certainly cause a relatively high transmission latency; and consequently a service requirement having a relatively high latency requirement cannot be satisfied. Therefore, a resource scheduling and allocation method is required to ensure data transmission reliability while satisfying an ultra-low latency requirement of a service.

SUMMARY

This specification describes an air interface resource scheduling and allocation method, an apparatus, and a system, to ensure data transmission reliability while satisfying an ultra-low latency requirement of a service.

According to one aspect, an embodiment of this application provides a resource scheduling and allocation method. The method includes: sending, by a network device, a downlink message, where an air interface resource used for N data transmissions is allocated to same user equipment by using the downlink message, and N is an integer greater than 1.

In a possible design, the network device allocates an air interface resource used for N data transmissions to same user equipment by using a downlink message, where N is an integer greater than 1. An air interface resource used for a plurality of data transmissions is allocated by using a downlink message, so that an uplink or a downlink data transmit end may perform a data retransmission without waiting for next scheduling or resource allocation. Therefore, a latency of a retransmission process is lowered, a quantity of pieces of downlink information used for resource allocation is also reduced, and a probability of correctly receiving data is also improved through the retransmission, thereby ensuring data transmission reliability.

In a possible design, the network device may allocate, by using a downlink control information, an air interface resource used for N data transmissions to same user equipment, the downlink control information includes information about the air interface resource used for the N data transmissions, and N is an integer greater than 1. Allocating, by using a downlink control information, an air interface resource used for a plurality of data transmissions is equivalent to directly scheduling a data retransmission, so that a probability of correctly receiving data is improved while lowering a latency of the retransmission scheduling.

In a possible design, the network device transmits or receives the N data transmissions on the air interface resource configured in the downlink control information.

In a possible design, the downlink control information further includes information about a value of N. The information about the value of N (that is, information about a quantity of transmissions of to-be-transmitted data) included in the downlink control information may clearly indicate a quantity of data transmissions performed by the network device or the user equipment. When a plurality of data transmissions are performed, a flexible air interface resource configuration can be supported. For example, the downlink control information may include information about N air interface resources used for the N data transmissions. Alternatively, the downlink control information may include only information about an air interface resource used for one data transmission, and for remaining transmissions, an air interface resource may be determined according to a rule. It may be understood that the information about the value of N may be a real value of N. Alternatively, the real value of N may be indicated in another indication manner. It may be understood that the value of N may alternatively be configured to 1, so that an air interface resource required by one data transmission is allocated by using the downlink control information.

In a possible design, the downlink control information may further include continuous transmission indication information. The continuous transmission indication information is used to indicate whether the downlink control information includes the information about the air interface resource used for the N data transmissions, or is used to indicate whether the downlink control information indicates N continuous transmissions. The continuous transmissions means that the N data transmissions are retransmissions, for example, automatic retransmissions such as blind retransmissions, that are performed without waiting for a negative acknowledgement (NACK) message or an acknowledgement (ACK) message fed back by a data receive end. It should be noted that the continuous transmissions in this application may be performed on continuous time domain resources in time. For example, the continuous transmissions are performed from an $n^{th}$ transmission time interval (TTI) to an $(n+N-1)^{th}$ TTI. Alternatively, the continuous transmissions may be performed on discontinuous time domain resources in time. For example, the transmissions are performed on N time domain resources determined according to a time domain resource determining rule, or the transmissions are performed on a time domain resource that is used for the N data transmissions and that is configured in the downlink control information. A manner of determining a frequency domain resource may also be determining the frequency domain resource according to a rule or based on a configuration in the downlink control information. This is not limited in this application. The continuous transmissions in this application may further include simultaneous data transmissions performed on N different frequency domain resources, that is, a same time domain resource and different frequency domain resources are used in the N data transmissions. In addition, the continuous transmissions may further include a mixture of the foregoing two manners, that is, the N data transmissions are performed on N different frequency domain resources in total that are distributed on at least two different time domain resources. Optionally, the continuous transmission indication information may use an independent information element to indicate continuous transmission information in the downlink control information, for example, an independent information element is a 1 bit information element. Optionally, the continuous transmission indication information may further be an information element used to indicate another information. For example, the continuous transmission information in the current downlink control information may be indicated by combining a predetermined or pre-agreed threshold and information indicated by an information element. The continuous transmission indication information may clearly indicate whether the network device or the user equipment needs to perform continuous transmissions such as blind retransmissions. When a plurality of data transmissions are performed, a flexible air interface resource configuration can be supported. For example, information about N air interface resources used for the N data transmissions may be configured in the downlink control information. Alternatively, only information about an air interface resource used for one data transmission may be configured in the downlink control information, and when the continuous transmission indication information indicates that the N data transmissions need to be performed currently, an air interface resource used for remaining N−1 transmissions may be determined according to a rule.

In a possible design, the information about the air interface resource includes a frequency domain resource indication of the air interface resource.

In a possible design, the information about the air interface resource further includes a time domain resource indication of the air interface resource and/or redundancy version (RV) information used for a data transmission.

In a possible design, the downlink control information includes information about an air interface resource used for the first data transmission corresponding to the downlink control information, and an air interface resource used for a remaining data transmission corresponding to the downlink control information is determined based on the information about the air interface resource used for the first data transmission. Only information about an air interface resource used for one transmission is delivered by using the downlink control information, so that a quantity of bits of the downlink control information can be reduced, thereby saving overheads of a control channel.

In a possible design, the downlink control information includes information about an air interface resource used for each data transmission corresponding to the downlink control information. The downlink control information carries the information about the air interface resource used for each data transmission, so that the air interface resource can be more flexibly allocated for each data transmission.

In a possible design, that the downlink control information includes information about an air interface resource used for the first data transmission corresponding to the downlink control information, and an air interface resource used for a remaining data transmission corresponding to the downlink control information is determined based on the information about the air interface resource used for the first data transmission includes: determining, based on a frequency domain resource indication used for the first data transmission, a frequency domain resource used for each remaining data transmission corresponding to the downlink control information. In a specific possible design, the determining, based on a frequency domain resource indication used for the first data transmission, a frequency domain resource used for each remaining data transmission corresponding to the downlink control information includes: using a frequency domain resource that is the same as that used for the first data transmission. In another specific possible design, the determining, based on a frequency domain resource indication used for the first data transmission, a frequency domain resource used for each remaining data transmission corresponding to the downlink control information includes: calculating, based on the frequency domain resource indication used for the first data transmission and according to a frequency hopping rule, a frequency domain resource used for a current transmission.

In a possible design, that the downlink control information includes information about an air interface resource used for the first data transmission corresponding to the downlink control information, and an air interface resource used for a remaining data transmission corresponding to the downlink control information is determined based on the information about the air interface resource used for the first data transmission includes: determining, based on a time domain resource indication used for the first data transmission, a time domain resource used for each remaining data transmission corresponding to the downlink control information. In a specific possible design, the determining, based on a time domain resource indication used for the first data transmission, a time domain resource used for each remaining data transmission corresponding to the downlink control information includes: using M symbols that may be used for a same service data transmission after the first data transmission or a previous data transmission, where M is the same as a quantity of symbols used for the first data transmission. In another specific possible design, the determining, based on a time domain resource indication used for the first data transmission, a time domain resource used for each remaining data transmission corresponding to the downlink control information includes: using a time domain resource that is the same as that used for the first data transmission or the previous data transmission. It should be noted that when a same time domain resource is used for X (X is an integer greater than 1) data transmissions, X different frequency domain resources need to be occupied. In this case, the data transmit end completes transmitting of X data transmissions by using one transmitting operation, and the data receive end completes receiving of the X data transmission by using one receiving operation.

In a possible design, that the downlink control information includes information about an air interface resource used for the first data transmission corresponding to the downlink control information, and an air interface resource used for a remaining data transmission corresponding to the downlink control information is determined based on the information about the air interface resource used for the first data transmission further includes: determining, according to a rule, a redundancy version used for each remaining data transmission corresponding to the downlink control information. In a specific possible design, the determining, according to a rule, a redundancy version used for each remaining data transmission corresponding to the downlink control information includes: using a redundancy version that is the same as that used for the first data transmission. In another specific possible design, the determining, according to a rule, a redundancy version used for each remaining data transmission corresponding to the downlink control information includes: using a corresponding redundancy version in each data transmission based on a redundancy version use sequence.

It should be noted that the "first data transmission" mentioned above is the first transmission in the N data transmissions corresponding to the downlink control information, and it is uncertain that the "first data transmission" is an initial transmission of the data in a communication process.

In a possible design, when performing the initial transmission scheduling on the to-be-transmitted data, the network device may further determine, based on a transmission latency requirement of a service to which the to-be-transmitted data belongs, a maximum quantity of transmissions that may be completed within a transmission latency range. The maximum quantity of transmissions is (a quantity of hybrid automatic repeat request (HARQ) retransmissions+a quantity of blind retransmissions+1). The blind retransmission means that the transmit end retransmits the data to the receive end for one or more times without needing to wait for a feedback message of the receive end or scheduling of the network device. An air interface resource and/or a modulation and coding scheme used for the initial transmission is selected with reference to the maximum quantity of transmissions. The allocating an air interface resource used for N data transmissions to same user equipment includes: allocating the air interface resource used for the N data transmissions to the same user equipment based on the selected air interface resource and/or the modulation and coding scheme used for the initial transmission. When the initial scheduling is performed on the to-be-transmitted data, the maximum quantity of transmissions that may be completed is determined based on a service latency of the to-be-transmitted data, and the air interface resource and/or the modulation and coding scheme used for the initial transmission is selected with reference to the determined maximum quantity of transmissions, so that a quantity of air interface resources that the data transmission occupies and/or the modulation and coding scheme may be adaptively adjusted, thereby further ensuring the probability of correctly transmitting the data. For example, in a specific possible design, if the maximum quantity of transmissions is less than three, the quantity of air interface resources may be appropriately increased and/or a code rate of the modulation and coding scheme may be appropriately reduced, thereby improving the data transmission reliability.

In a possible design, during each transmission scheduling of the to-be-transmitted data, the network device may determine, based on a remaining transmission latency, whether a HARQ retransmission may further be completed after the current transmission. If the HARQ retransmission cannot be completed in the remaining transmission latency after the current transmission, a blind retransmission is arranged after the current transmission. The air interface resource used for the N data transmissions includes air interface resources used for the current transmission and the blind retransmission. That the HARQ retransmission is completed is a process in which the data transmit end waits for an ACK or NACK feedback of the receive end for a previous data transmission and retransmits the data after receiving the NACK feedback, and the receive end completes decoding on the retransmitted data. As many as possible HARQ retransmissions are arranged within a latency allowance range, so that the data transmission reliability can be improved at the greatest extent. If the latency cannot support one or more HARQ retransmissions, a blind retransmission may be arranged after the HARQ retransmission or the initial transmission, so that the data transmission reliability is further improved within the latency allowance range. During each transmission scheduling, the foregoing determining for a subsequent latency and a retransmission solution is performed, so that a subsequent retransmission type may be more flexibly adjusted based on a remaining transmission latency, thereby ensuring correct data transmission within the latency range at the greatest extent.

In a possible design, if a (the maximum quantity of transmissions$-1)^{th}$ transmission of the to-be-transmitted data is not a blind retransmission, during the (the maximum quantity of transmissions$-1)^{th}$ transmission scheduling of the to-be-transmitted data, the network device may further determine, based on a remaining transmission latency, whether a HARQ retransmission may further be completed after the current transmission. If the HARQ retransmission cannot be completed in the remaining transmission latency after the current transmission, a blind retransmission is arranged after the current transmission. The air interface resource used for the plurality of data transmissions includes air interface resources used for the current transmission and the blind retransmission. That the HARQ retransmission is completed is a process in which the data transmit end waits for an ACK or NACK feedback of the receive end for a previous data transmission and retransmits the data after receiving the NACK feedback, and the receive end completes decoding on the retransmitted data. The determining for a subsequent latency and a retransmission solution is performed only during the (the maximum quantity of transmissions$-1)^{th}$ transmission scheduling, and load of the network device is considered, so that correct data transmission can be ensured as much as possible by adjusting a retransmission type within the latency range, and the load of the network device can also be reduced. It may be understood that the network device may further perform the foregoing determining for a subsequent latency and a retransmission solution during any transmission scheduling. For example, the network device may select to perform the determining for a subsequent latency and a retransmission solution during the last HARQ retransmission scheduling within the transmission latency range.

According to another aspect, an embodiment of this application provides a resource scheduling and allocation method. The method includes: receiving, by user equipment, a downlink message, where an air interface resource used for N data transmissions is allocated to same user equipment by using the downlink message, and N is an integer greater than 1.

In a possible design, the user equipment receives the downlink message, and parses the air interface resource that is used for the N data transmissions, that is allocated to the user equipment, and that is included in the downlink message, where N is an integer greater than 1.

In a possible design, the user equipment obtains an air interface resource that is used for N data transmissions and that is allocated by a network device by using a downlink control information, where the downlink control information includes information about the air interface resource used for the plurality of data transmissions, and N is an integer greater than 1.

In a possible design, the user equipment transmits or receives the N data transmissions on the air interface resource configured in the downlink control information.

In a possible design, the downlink control information further includes information about a value of N. It may be understood that the information about the value of N may be a real value of N. Alternatively, the real value of N may be indicated in another indication manner. Apparently, the value of N may alternatively be configured to 1, so that an air interface resource required by one data transmission is allocated by using the downlink control information.

In a possible design, the downlink control information may further include continuous transmission indication information. The continuous transmission indication information is used to indicate whether the downlink control information includes information about the air interface resource used for the N data transmissions, or is used to indicate whether the downlink control information indicates N continuous transmissions. The continuous transmissions means that the N data transmissions are retransmissions, for example, automatic retransmissions such as blind retransmissions, that are performed without waiting for an NACK message or an ACK message fed back by a data receive end. It should be noted that the continuous transmissions in this application may be performed on continuous time domain resources in time. For example, the continuous transmissions are performed from an $n^{th}$ TTI to an $(n+N-1)^{th}$ TTI. Alternatively, the continuous transmissions may be performed on discontinuous time domain resources in time. For example, the transmissions are performed on N time domain resources determined according to a time domain resource determining rule, or the transmissions are performed on a time domain resource that is used for the N data transmissions and that is configured in the downlink control information. A manner of determining a frequency domain resource may also be determining the frequency domain resource according to a rule or based on a configuration in the downlink control information. This is not limited in this application.

In a possible design, the information about the air interface resource includes a frequency domain resource indication of the air interface resource.

In a possible design, the information about the air interface resource further includes a time domain resource indication of the air interface resource and/or redundancy version (RV) information used for a data transmission.

In a possible design, the downlink control information includes information about an air interface resource used for the first data transmission corresponding to the downlink control information, and an air interface resource used for a remaining data transmission corresponding to the downlink control information is determined based on the information about the air interface resource used for the first data transmission. Only information about an air interface resource used for one transmission is delivered by using the downlink control information, so that a quantity of bits of the downlink control information can be reduced, thereby saving overheads of a control channel.

In a possible design, the downlink control information includes information about an air interface resource used for each data transmission corresponding to the downlink control information. The downlink control information carries the information about the air interface resource used for each data transmission, so that the air interface resource can be more flexibly allocated for each data transmission.

In a possible design, that the downlink control information includes information about an air interface resource used for the first data transmission corresponding to the downlink control information, and an air interface resource used for a remaining data transmission corresponding to the downlink control information is determined based on the information about the air interface resource used for the first data transmission includes: determining, based on a frequency domain resource indication used for the first data transmission, a frequency domain resource used for each remaining data transmission corresponding to the downlink control information. In a specific possible design, the determining, based on a frequency domain resource indication used for the first data transmission, a frequency domain resource used for each remaining data transmission corresponding to the downlink control information includes: using a frequency domain resource that is the same as that used for the first data transmission. In another specific possible design, the determining, based on a frequency domain resource indication used for the first data transmission, a frequency domain resource used for each remaining data transmission corresponding to the downlink control information includes: calculating, based on the frequency domain resource indication used for the first data transmission and according to a frequency hopping rule, a frequency domain resource used for a current transmission.

In a possible design, that the downlink control information includes information about an air interface resource used for the first data transmission corresponding to the downlink control information, and an air interface resource used for a remaining data transmission corresponding to the downlink control information is determined based on the information about the air interface resource used for the first data transmission includes: determining, based on a time domain resource indication used for the first data transmission, a time domain resource used for each remaining data transmission corresponding to the downlink control information. In a specific possible design, the determining, based on a time domain resource indication used for the first data transmission, a time domain resource used for each remaining data transmission corresponding to the downlink control information includes: using M symbols that may be used for a same service data transmission after the first data transmission or a previous data transmission, where M is the same as a quantity of symbols used for the first data transmission. In another specific possible design, the determining, based on a time domain resource indication used for the first data transmission, a time domain resource used for each remaining data transmission corresponding to the downlink control information includes: using a time domain resource that is the same as that used for the first data transmission or the previous data transmission. It should be noted that when a same time domain resource is used for X (X is an integer greater than 1) data transmissions, X different frequency domain resources need to be occupied. In this case, a data transmit end completes transmitting of X data transmissions by using one transmitting operation, and the data receive end completes receiving of the X data transmission by using one receiving operation.

In a possible design, that the downlink control information includes information about an air interface resource used for the first data transmission corresponding to the downlink control information, and an air interface resource used for a remaining data transmission corresponding to the downlink control information is determined based on the information about the air interface resource used for the first data transmission further includes: determining, according to a rule, a redundancy version used for each remaining data transmission corresponding to the downlink control information. In a specific possible design, the determining, according to a rule, a redundancy version used for each remaining data transmission corresponding to the downlink control information includes: using a redundancy version that is the same as that used for the first data transmission. In another specific possible design, the determining, according to a rule, a redundancy version used for each remaining data transmission corresponding to the downlink control information includes: using a corresponding redundancy version in each data transmission based on a redundancy version use sequence.

It should be noted that the "first data transmission" mentioned above is the first transmission in the plurality of data transmissions corresponding to the downlink control information, and it is uncertain that the "first data transmission" is an initial transmission of data in a communication process.

According to another aspect, an embodiment of this application provides a network device. The network device has a function of implementing operations of the network device in the foregoing methods. The function may be implemented by using hardware, or may be implemented by hardware executing corresponding software. The hardware or software includes one or more modules corresponding to the foregoing function.

In a possible design, a structure of the network device includes a processor and a transmitter. In a possible design, the structure of the network device may further include a receiver. The processor is configured to support the network device to perform a corresponding function in the foregoing methods. The transmitter and the receiver are configured to support communication between the network device and user equipment. The transmitter is configured to transmit the information or data in the foregoing methods to the user equipment. The receiver is configured to support the network device to receive the information or data transmitted by the user equipment in the foregoing methods. The network device may further include a memory. The memory is configured to couple to the processor and store a necessary program instruction and necessary data of the network device.

According to another aspect, an embodiment of this application provides user equipment. The user equipment has a function of implementing operations of the user equipment in the foregoing methods. The function may be implemented by using hardware, or may be implemented by hardware executing corresponding software. The hardware or software includes one or more modules corresponding to the foregoing function.

In a possible design, a structure of the user equipment includes a processor and a receiver. In a possible design, the structure of the user equipment may further include a transmitter. The processor is configured to support the user equipment to perform a corresponding function in the foregoing methods. The transmitter is configured to support the user equipment to transmit the information or data in the foregoing methods to a network device. The receiver is configured to support the user equipment to receive the information or data transmitted by the network device in the foregoing methods. The user equipment may further include a memory. The memory is configured to couple to the processor and store a necessary program instruction and necessary data of the user equipment.

According to another aspect, an embodiment of this application provides a communications system. The system includes the network device and the user equipment according to the foregoing aspects.

According to still another aspect, an embodiment of this application provides a computer storage medium. The computer storage medium is configured to store a computer software instruction used by the foregoing network device, and the computer software instruction includes a program designed to perform the foregoing aspects.

According to still another aspect, an embodiment of this application provides a computer storage medium. The computer storage medium is configured to store a computer software instruction used by the foregoing user equipment, and the computer software instruction includes a program designed to perform the foregoing aspects.

According to still another aspect, an embodiment of this application provides a computer program product including an instruction, and when the computer program product is executed on a computer, the computer is caused to perform the methods of the network device.

According to still another aspect, an embodiment of this application provides a computer program product including an instruction, and when the computer program product is executed on a computer, the computer is caused to perform the methods of the user equipment.

Compared with the prior art, in the solutions provided in this application, a transmission latency requirement of a service and data transmission reliability are comprehensively considered, and data retransmission is performed by flexibly scheduling and allocating a retransmission type and a corresponding air interface resource within a latency allowance range, so that the data transmission reliability is ensured while the transmission latency requirement of the service is satisfied.

BRIEF DESCRIPTION OF DRAWINGS

The embodiments of this application are described below in more detail with reference to the accompanying drawings.

DESCRIPTION OF EMBODIMENTS

A network architecture and service scenarios described in the embodiments of this application aim to more clearly describe the technical solutions in the embodiments of this application, but are not construed as limitations to the technical solutions provided in the embodiments of this application. A person of ordinary skill in the art may know that as the network architecture evolves and a new service scenario emerges, the technical solutions provided in the embodiments of this application are further applicable to a similar technical problem.

Figure 1:
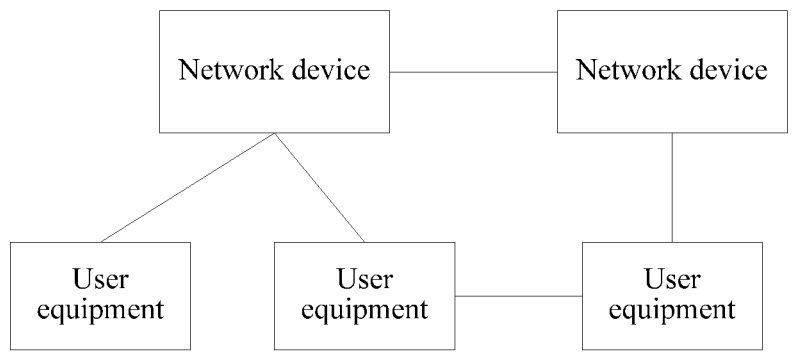
FIG. 1 is a schematic diagram of a possible application scenario according to this application.

A technology described in this application may be applicable to a Long Term Evolution (LTE) system and a subsequent evolved system such as the 5th generation mobile communications (5G), or other wireless communications systems using various radio access technologies, for example, systems using an access technology such as code division multiple access, frequency division multiple access, time division multiple access, orthogonal frequency division multiple access, and single-carrier frequency division multiple access. The technology is particularly applicable to a service scenario having a relatively high latency and data reliability requirement, for example, an ultra-reliable and low latency communications scenario in the 5G. As shown in FIG. 1, FIG. 1 is a simplified network architectural diagram of a communications system according to an embodiment of this application. User equipment (UE) communicates with a network device by accessing the network device by using a wireless interface, or may communicate with another user equipment, for example, communication in a D2D (device to device, device-to-device) or an M2M (machine to machine, machine-to-machine) scenario. A network device may communicate with user equipment, or may communicate with another network device, for example, communication between a macro base station and an access point.

In this application, terms "network" and "system" are usually interchangeable, and a person skilled in the art may understand their meanings. The user equipment in this application may include various handheld devices, in-vehicle devices, wearable devices, computing devices, and control devices that have a wireless communication function, or another processing device connected to a wireless modem, and user equipment (UE), a mobile station (MS), a terminal, terminal equipment, or the like of various forms. For ease of description, in this application, the devices mentioned above are collectively referred to as user equipment or UE. The network device in this application includes a base station (BS), a network controller, a mobile switching center, or the like. An apparatus that directly communicates with the user equipment by using a radio channel is usually a base station. The base station may include a macro base station, a micro base station, a relay node, an access point, a remote radio unit (RRU), or the like of various forms. Certainly, another network device having the wireless communication function may also perform wireless communication with the user equipment. This is not uniquely limited in this application. In systems using different radio access technologies, names of devices having a base station function may be different. For example, in an LTE network, the device is referred to as an evolved NodeB (evolved NodeB, eNB or eNodeB). In a 3rd generation 3G network, the device is referred to as a NodeB (Node B).

A "resource scheduling and allocation method" mentioned in this application may also be defined as a "resource scheduling method" or a "resource allocation method", because that the network device allocates a resource to the user equipment or the user equipment receives the resource of the network device essentially is resource or user equipment scheduling, and the resource or user equipment scheduling certainly corresponds to resource allocation.

A "service transmission latency", a "service latency", a "transmission latency", and a "latency" mentioned in this application are all time spent for a process in which a series of processing such as encoding is performed on original data, the processed data is sent by a transmit end and transmitted to a receive end by using a channel, the data is successfully decoded, and the data is restored to the original data, that is, a latency from a time point at which a data packet is generated at the transmit end to a time point at which the data packet is correctly received by the receive end.

Figure 2:
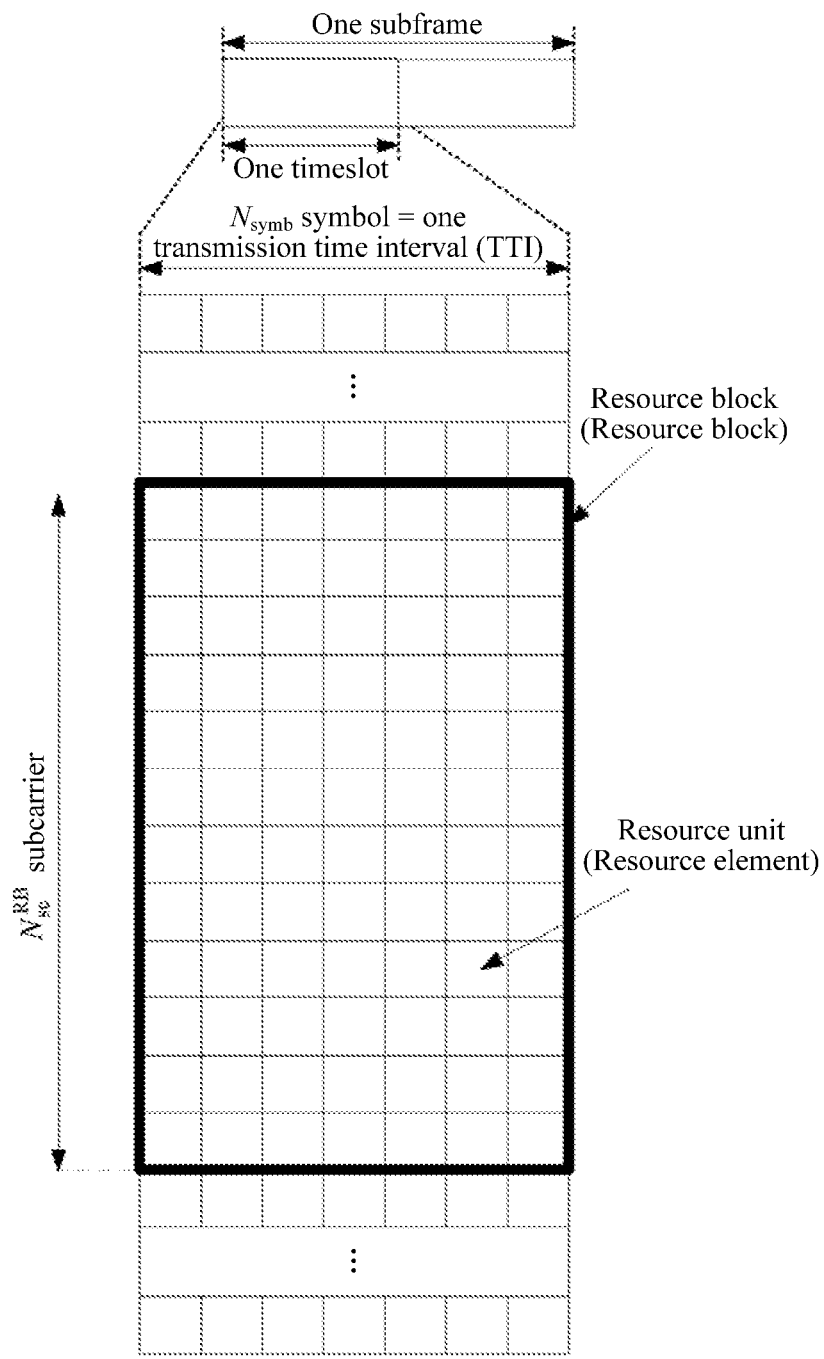
FIG. 2 is a schematic diagram of possible air interface resource allocation according to this application.

A basic concept for defining an air interface resource and a basic division manner of the air interface resource are described below with reference to FIG. 2. An air interface resource includes a time domain resource and a frequency domain resource of an air interface, and is usually represented by using a term such as a resource element (RE), a resource block (RB), a subcarrier, a symbol, or a transmission time interval (TTI). An air interface resource is usually divided in terms of a frequency domain and a time domain. The air interface resource is divided into subcarriers in terms of the frequency domain, or is divided into symbols in terms of the time domain. The entire air interface resource includes frequency domain and time domain division grids shown in FIG. 2. Each grid is a resource element, and represents a resource of a subcarrier within a symbol time. Each resource element may carry particular information. $N_{symb}$ symbols form a TTI in time. $N_{SC}^{RB}$ subcarriers in a TTI are combined to form a resource block. For ease of resource scheduling and allocation, usually concepts such as a timeslot (slot) and a subframe are further defined in terms of the time domain. It can be learned that each TTI in FIG. 2 includes seven symbols, each resource block includes 12 subcarriers, every seven symbols are a timeslot, and two timeslots form a subframe. This is a relatively typical air interface resource division manner and is merely a specific example for describing an air interface resource division principle. There may be other time domain and frequency domain resource division manners in different systems. For example, only one subcarrier may exist in a frequency domain in a single-carrier system, or a symbol may be a TTI in a system having a relatively high latency requirement. A specific air interface resource division manner is not uniquely limited in this embodiment of this application.

The "transmission time interval (TTI)" in this application may be any one of a symbol, a subframe, a timeslot (slot), or a mini-slot (mini slot), or may include at least one subframe, at least one symbol, at least one timeslot, or at least one mini-slot. Optionally, the solutions in the embodiments of the present invention may further be applied to a time unit such as a symbol, a subframe, a timeslot, or a mini-slot, or applied to a time unit such as at least one symbol, at least one subframe, at least one timeslot, or at least one mini-slot. A specific implementation is the same as that when a TTI or a subframe is used as a time unit, and details are not described herein again.

When allocating an air interface resource for a data transmission, the network device usually delivers, by using a downlink control message, information that may indicate a time domain resource and/or a frequency domain resource. The time domain resource may be allocated by delivering a quantity of available symbols or a timeslot number in the data transmission, or using all symbols of an entire subframe by default. The frequency domain resource may be allocated by delivering an initial resource block index and a length of an available resource block, or an available resource block group may be indicated by allocating a resource block into resource block groups (Resource Block Group, RBG) and delivering a bitmap (bitmap), or an available frequency domain resource may be indicated by predefining a resource block selection rule and delivering a corresponding rule index, or the like. A time domain resource indication and/or a frequency domain resource indication mentioned in this application includes all information that can define the air interface resource. A specific indication manner is not uniquely defined in this application.

Figure 3:
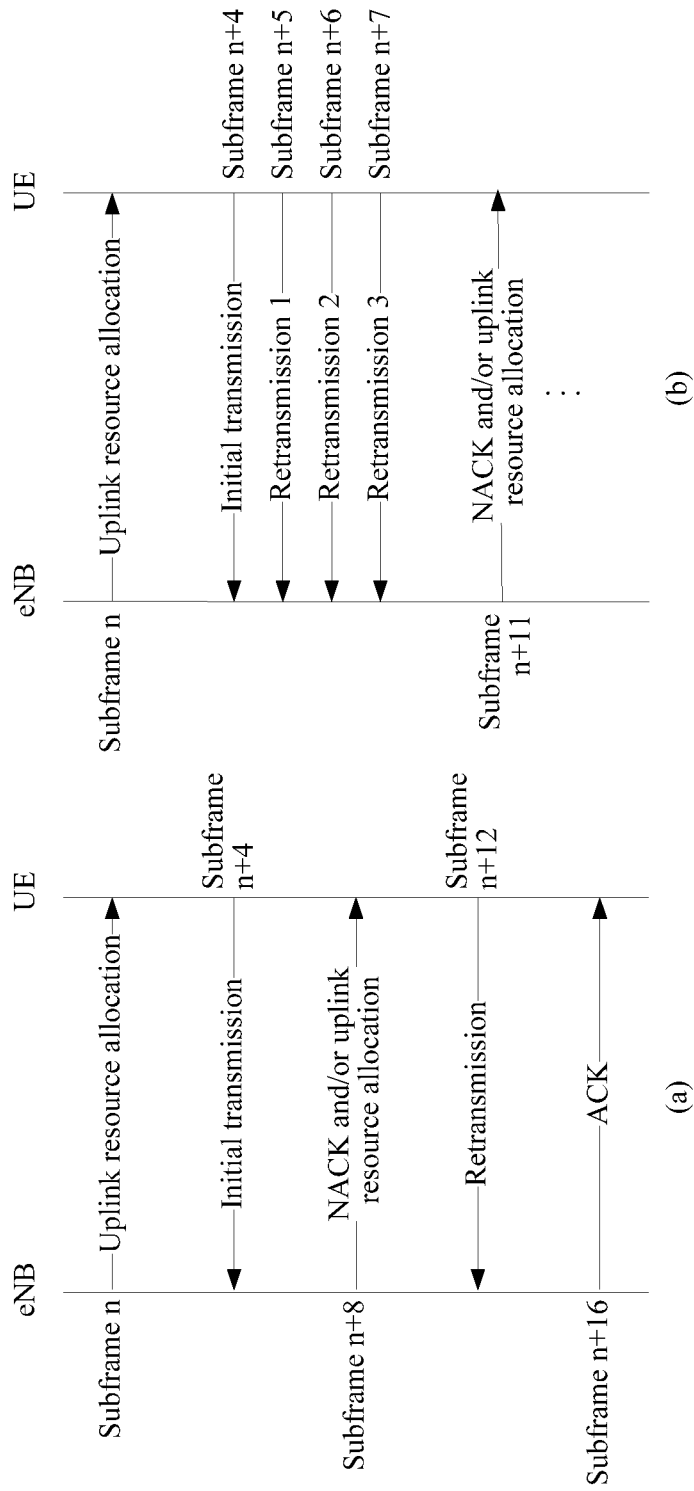
FIG. 3 is a schematic flowchart of a HARQ retransmission and a blind retransmission in the prior art.

Basic procedures of a retransmission triggered by using a hybrid automatic repeat request (HARQ) and a blind retransmission in the prior art are described below with reference to FIG. 3. Using an uplink HARQ process in an LTE system as an example, as shown in FIG. 3(a), an eNB first allocates an uplink air interface resource used for a data transmission to UE in an $n^{th}$ subframe, and the UE initially transmits data in an $(n+4)^{th}$ subframe. Assuming that the eNB fails to decode the data after receiving the initially transmitted data, the eNB feeds back a negative acknowledgement (NACK) message to the UE in an $(n+8)^{th}$ subframe to trigger the UE to retransmit the data on a subsequent frequency domain resource having same subframes. In some possible cases, the eNB allocates a new uplink air interface resource used for a retransmission to the UE again when feeding back the NACK. After receiving the NACK and/or an uplink resource allocation message fed back by the eNB, the UE retransmits the data in an $(n+12)^{th}$ subframe. If the eNB can correctly decode the transmitted data after the retransmission, the eNB feeds back an acknowledgement (ACK) message to the UE in an $(n+16)^{th}$ subframe, so that a transmission process for the data ends. If the eNB still fails to decode the data after the first retransmission, the eNB triggers a retransmission by feeding back an NACK and/or an uplink resource allocation message to the UE based on the foregoing procedure again, until the data is correctly decoded or a set maximum quantity of retransmissions is reached. It can be learned from the foregoing basic procedure of the HARQ retransmission that, in a HARQ technology, data transmission reliability is ensured by using a plurality of acknowledgement feedbacks and retransmissions. However, for a service data transmission having a relatively high latency requirement, a plurality of acknowledgement feedbacks and retransmissions cannot be completed within a latency limited range. In this case, the data transmission reliability is affected.

Still using the uplink transmission in the LTE system as an example, FIG. 3(b) shows an application manner of a blind retransmission technology (which is also referred to as a TTI bundling technology in the LTE system) in the LTE system. The eNB allocates an uplink air interface resource used for a data transmission to the UE in the $n^{th}$ subframe, the UE continuously performs an initial transmission and three retransmissions from the $(n+4)^{th}$ subframe to an $(n+7)^{th}$ subframe, the eNB performs joint decoding on all the received data after receiving the last retransmitted data, and if the decoding is successful, the eNB feeds back an ACK; or if the decoding fails, the eNB feeds back an NACK and/or an uplink resource allocation message to trigger next continuous retransmissions. In this type of blind retransmission technology, although the data transmission reliability is ensured through an automatic retransmission after the first resource allocation, a waste of resources exists in a scenario in which channel quality is relatively good.

According to the solution provided in this embodiment of this application, an air interface resource and a retransmission type may be dynamically scheduled and allocated based on a latency required by a service, so that the data transmission reliability is ensured when the latency requirement of the service is satisfied. This embodiment of this application is further described below in detail based on a common aspect in this application that is described above.

Figure 4:
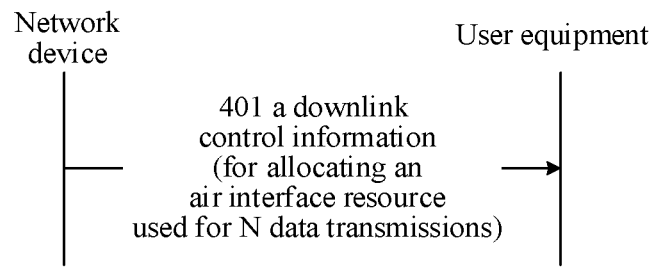
FIG. 4 is a schematic flowchart of an air interface resource scheduling and allocation method according to an embodiment of this application.

An embodiment of this application provides a resource scheduling and allocation method, as shown in FIG. 4.

In a part 401, a network device allocates an air interface resource used for N data transmissions to same user equipment by using a downlink control information. The downlink control information includes information about the air interface resource used for the N data transmissions, where N is an integer greater than 1.

In an example, the foregoing air interface resource scheduling and allocation may be implemented by carrying an information element listed in Table 1 in the downlink control information. An optional information element in the table may be omitted based on a specific situation. In a specific example, an information element carrying information about a value of N may determine a specific quantity of bits based on a specific range of the value of N. For example, the information element is designed in a manner shown in Table 2 or Table 3. In the design manner of Table 2, resource allocation in which one bit can support a maximum of two data transmissions is used. In the design manner of Table 3, resource allocation in which two bits can support a maximum of four data transmissions is used. In a specific example, the information about the value of N may be omitted. In this case, only one data transmission is performed corresponding to the current downlink control information. For a frequency domain resource used for a data transmission, the frequency domain resource may be allocated by delivering an initial resource block index and a length of an available resource block, or an available resource block group may be indicated by dividing a resource block into resource block groups and delivering a bitmap, or an available frequency domain resource may be indicated by predefining a resource block selection rule and delivering a corresponding rule index, or the like. A time domain resource used for a data transmission may be allocated by delivering a quantity of available symbols or a timeslot number in the data transmission. The quantity of available symbols may be designed in a manner shown in Table 4, or the information element may be omitted and all symbols of an entire subframe are used for the transmission by default. For a redundancy version (RV) used for a data transmission, a specific redundancy version number may be indicated by directly using two bits in a prior art manner, or a redundancy version use sequence such as {0, 2, 1, 3} may be predefined and redundancy versions in the use sequence are sequentially used based on a transmission sequence.

In a specific example, when the information about the air interface resource used for the N data transmissions is configured in the downlink control information, the information about the value of N may be omitted. In this case, a quantity of data transmissions (that is, the value of N) may be determined based on a quantity of pieces of air interface resource information that is included in the downlink control information.

Information elements that may be indicated in the prior art in Table 1 may be designed with reference to related technical stipulations in an existing wireless system, for example, specific stipulations in a 3rd Generation Partnership Project 3GPP (3rd Generation Partnership Project) TS (Technical Specification) 36.212 and 36.213 in an LTE system, and details are not described herein.

TABLE 1

Information element used for allocating the air interface resource in the downlink control information

| Information element | Length or format |
| --- | --- |
| Information about the value of N (optional) | A specific quantity of bits is determined based on a range of the value of N |
| A frequency domain resource indication used for the first data transmission | An indication method in the prior art may be used |
| A time domain resource indication used for the first data transmission (optional) | An indication method in the prior art or an indication method shown in Table 4 may be used |
| A redundancy version used for the first data transmission (optional) | An indication method in the prior art may be used |
| A frequency domain resource indication used for the second data transmission (optional) | An indication method in the prior art may be used |
| A time domain resource indication used for the second data transmission (optional) | An indication method in the prior art or an indication method shown in Table 4 may be used |
| A redundancy version used for the second data transmission (optional) | An indication method in the prior art may be used |
| A frequency domain resource indication used for the third data transmission (optional) | An indication method in the prior art may be used |
| A time domain resource indication used for the third data transmission (optional) | An indication method in the prior art or an indication method shown in Table 4 may be used |
| A redundancy version used for the third data transmission (optional) | An indication method in the prior art may be used |
| . . . | . . . |
| A frequency domain resource indication used for an $N^{th}$ data transmission (optional) | An indication method in the prior art may be used |
| A time domain resource indication used for the $N^{th}$ data transmission (optional) | An indication method in the prior art or an indication method shown in Table 4 may be used |
| A redundancy version used for the $N^{th}$ data transmission (optional) | An indication method in the prior art may be used |

TABLE 2

Specific design method of the information element carrying the information about the value of N

| Value | Indicated value of N |
| --- | --- |
| 0 | 1 |
| 1 | 2 |

TABLE 3

Another specific design method of the information element carrying the information about the value of N

| Value | Indicated value of N |
| --- | --- |
| 00 | 1 |
| 01 | 2 |
| 10 | 3 |
| 11 | 4 |

TABLE 4

Specific design method of a time domain resource indication information element used for a data transmission

| Value | Indicated quantity of symbols |
| --- | --- |
| 00 | 1 |
| 01 | 2 |
| 10 | 4 |
| 11 | 8 |

In another example, only information about an air interface resource used for the first data transmission may be configured in the downlink control information. During the first data transmission corresponding to the current downlink control information, the air interface resource configured in the downlink control information in used, and an air interface resource used for a remaining transmission is determined based on the air interface resource used for the first transmission. Specifically, for a frequency domain resource used for the remaining transmission, a frequency domain resource the same as that used for the first transmission may be used, or the frequency domain resource used for the current transmission may be calculated according to a frequency hopping rule based on information about the frequency domain resource used for the first transmission. For example, assuming that in a downlink resource allocation process, an index of an RB resource used for the first transmission is K (K is an integer greater than or equal to 0), an index of an RB resource used for the first blind retransmission may be ((K+j) mod a quantity of downlink RB resources in a cell), and an index of an RB resource used for the second blind retransmission may be ((K+j/2) mod the quantity of downlink RB resources in the cell), where j=(the quantity of downlink RB resources in the cell/2), and mod indicates a modulo operation in mathematical calculation. For a time domain resource used for the remaining transmission, M symbols that may be used for a same service data transmission after the first data transmission may be used, where M is the same as a quantity of symbols used for the first data transmission, or a time domain resource that is the same as that used for the first data transmission or a previous data transmission may be used. It should be noted that when a same time domain resource is used for X (X is an integer greater than 1) data transmissions, X different frequency domain resources need to be occupied. In this case, a data transmit end completes transmitting of X data transmissions by using one transmitting operation, and a data receive end completes receiving of the X data transmission by using one receiving operation. For a redundancy version used for a remaining transmission, a redundancy version that is the same as that used for the first transmission may be used, or the redundancy version may be used based on a transmission sequence. For example, if a possible redundancy version sequence is {0, 2, 1, 3}, the redundancy version may be used based on the transmission sequence, that is, a redundancy version 0 is used for the first data transmission, a redundancy version 2 is used for the second data transmission, a redundancy version 1 is used for the third data transmission, and a redundancy version 3 is used for the fourth data transmission.

Optionally, when a same time domain resource is used for X (X is an integer greater than 1) data transmissions, X different frequency domain resources need to be occupied. In this case, the data transmit end completes transmitting of X data transmissions by using one transmitting operation, and the data receive end completes receiving of the X data transmission by using one receiving operation. X may be equal to N, that is, the N data transmissions are performed on the same time domain resource. Alternatively, X may be less than N, that is, X data transmissions in the N data transmissions are performed on the same time domain resource.

In an example, the downlink control information may further include continuous transmission indication information. The continuous transmission indication information is used to indicate whether the downlink control information includes the information about the air interface resource used for the N data transmissions, or is used to indicate whether the downlink control information indicates N continuous transmissions. The continuous transmissions are retransmissions that are not based on a HARQ mechanism, that is, the data transmit end may perform retransmissions, for example, automatic retransmissions such as blind retransmissions, without waiting for the data receive end to feed back an NACK or an ACK.

In a specific example, the continuous transmission indication information may be an independent information element. For example, continuous transmission information in the downlink control information may be indicated by using a one bit information element. For example, when a value of the one bit information element is "1", it indicates that continuous data transmissions are performed. The data transmit end transmits data for N times from an $x^{th}$ TTI after the downlink control information is sent, and the data receive end receives the data for the N times from the $x^{th}$ TTI after the downlink control information is receive. The data transmit end and the data receive end use the air interface resource that is used for the N data transmissions and that is configured in the downlink control information, where x is an integer greater than or equal to 0 and may be determined according to a present rule. When the value of the one bit (bit) information element is "0", it indicates that continuous data transmissions are not performed. The data transmit end and the data receive end may perform data transmissions or retransmissions by using the information about the air interface resource that is configured in the downlink control information.

In another specific example, the continuous transmission indication information may alternatively be an information element used to indicate another information. For example, the continuous transmission information in the current downlink control information may be indicated by combining a predetermined or pre-agreed threshold and information indicated by an information element. Optionally, the threshold may be statically, semi-statically, or dynamically configured. The threshold may be more flexibly configured or updated by semi-statically or dynamically configuring the threshold, thereby flexibly changing a condition for triggering the continuous transmissions. Optionally, the network device may send the threshold to the user equipment by using any one or at least one of physical layer control signaling, Radio Resource Control layer signaling, or Media Access Control layer signaling. Certainly, signaling of another type may further be used. This is not limited in this application. For example, the continuous transmission indication information may be indicated by using a predefined threshold by using an information element used to indicate modulation and coding scheme information. The downlink control information may include the modulation and coding scheme information, such as modulation and coding scheme (MCS) indication information. The data transmit end and the data receive end may pre-agree an MCS threshold. When a modulation and coding scheme indicated in the downlink control information is less than the MCS threshold, it indicates continuous transmissions; otherwise, it indicates discontinuous transmissions.

Optionally, the downlink control information may include at least one of the continuous transmission indication information and the information about the value of N. In this case, the air interface resource used for the N data transmissions may be directly configured in the downlink control information. Alternatively, only an air interface resource used for one data transmission may be configured in the downlink control information, and information about an air interface resource used for remaining N−1 data transmissions is determined based on the configured air interface resource information. Optionally, the air interface resource used for the N data transmissions may alternatively be directly configured in the downlink control information, and the data transmit end and the data receive end directly transmit and receive data on the configured air interface resource used for the N data transmissions. For a specific air interface resource configuration manner, refer to the foregoing descriptions, and details are not described herein again.

In an example, the network device or the UE transmits or receives the N data transmissions on the air interface resource configured in the downlink control information.

In a specific example, if an uplink data transmission needs to be performed, the UE receives the downlink control information, parses the air interface resource that is used for the N data transmissions and that is included in the downlink control information, and transmits the N data transmissions on the air interface resource configured in the downlink control information (when N is not configured, only one data transmission is transmitted); and the network device receives the N data transmissions on the corresponding air interface resource (when N is not configured, only one data transmission is received), and then performs related operations such as demodulation and decoding on data received for N times (or once).

In another specific example, if a downlink data transmission is required, the network device transmits the N data transmissions on the air interface resource configured in the downlink control information (when N is not configured, only one data transmission is transmitted). The UE receives the downlink control information, parses the air interface resource that is used for the N data transmissions and that is included in the downlink control information, receives the N data transmissions on the corresponding air interface resource (when N is not configured, only one data transmission is received), and then performs related operations such as demodulation and decoding on data received for N times (or once).

The embodiments of this application are further described below with reference to more accompanying drawings.

Figure 5:
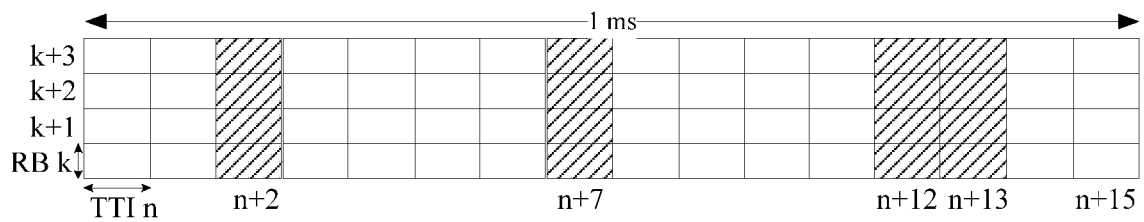
FIG. 5 is a schematic diagram of downlink resource scheduling and allocation according to an embodiment of this application.

FIG. 5 is a schematic diagram of downlink resource scheduling and allocation according to an embodiment of this application.

In an example of an air interface resource structure shown in FIG. 5, one or more symbols form a TTI. A system performs time domain resource scheduling by using a TTI as a unit. A total time length of 16 TTIs is 1 ms. For simplicity and convenience, specific symbols are omitted in the example, so that a TTI is used as a minimum unit for indication on a time domain. On a frequency domain, several subcarriers form an RB. For simplicity and convenience, specific subcarriers are omitted in the example, so that an RB is used as a minimum unit for indication on the frequency domain.

To clearly describe an implementation method of the resource scheduling and allocation in this application, in a specific embodiment, it is assumed that in a HARQ transmission, an interval of four TTIs is required between the current transmission and a next transmission and is used for transmitted data receiving and decoding, an ACK/NACK feedback, and receiving and decoding. After data is transmitted from a transmit end, a received end further needs two TTIs for decoding the data. Based on the foregoing assumption, in this specification, seven TTIs are required by a process in which a HARQ retransmission is completed, that is, a process in which the data transmit end waits for an ACK or NACK feedback of the receive end for a previous data transmission, retransmits the data after receiving the NACK feedback, and the receive end completes decoding on the retransmitted data. In the seven TTIs, four TTIs are used for waiting and receiving the ACK or NACK feedback, one TTI is used for the retransmission, and two TTIs are used for decoding the retransmitted data. It should be noted that in different systems, the interval and a time used for the decoding may vary. However, the variations do not affect a principle and an implementation of the solutions provided in this embodiment of this application. This is not uniquely limited in this application.

In the example provided in FIG. 5, if to-be-transmitted data reaches the network device at a TTI n moment, and a data transmission latency required by a service to which the data belongs is 1 ms, the network device may identify that decoding on the data needs to be completed at a TTI n+15 moment at latest. Considering that the receive end further requires two TTIs for decoding, the latest transmitting of the data needs to be completed at or before a TTI n+13.

In an example, when the network device performs initial transmission scheduling on the to-be-transmitted data, a maximum quantity of transmissions of the to-be-transmitted data that may be completed within a transmission latency range is determined based on a transmission latency required by a service of the to-be-transmitted data. The maximum quantity of transmissions (a quantity of hybrid automatic repeat requests+a quantity of blind retransmissions+1). The blind retransmission is one or more data retransmissions performed by the transmit end to the receive end without waiting for a feedback message of the receive end or scheduling performed by the network device. Specifically, with reference to the example shown in FIG. 5, the network device initially transmits the to-be-transmitted data at a TTI n+2. After performing the initial transmission at the TTI n+2, the network device may further determine, based on the 1 ms latency limit, the four TTI intervals required by the HARQ retransmission, and two TTIs used by the receive end for decoding, that two HARQ retransmissions may be arranged at a TTI n+7 and a TTI n+12. After the retransmission at the TTI n+12, the receive end may complete decoding on the retransmitted data (that is, the HARQ retransmission is completed), but does not have time to support the transmit end to receive an ACK/NACK feedback and decode next retransmitted data. Consequently, a HARQ retransmission cannot be further completed in remaining three TTIs. However, a blind retransmission may further be performed at the TTI n+13, and the receive end may complete decoding on the blindly retransmitted data at the TTI n+15 (that is, within 1 ms). Based on the foregoing determining, the network device may learn that a maximum quantity of transmissions of the data is four.

In an example, the network device selects, with reference to the maximum quantity of transmissions, an air interface resource and/or a modulation and coding scheme used for the initial transmission. Specifically, with reference to the example provided in FIG. 5, the network device considers that data transmission reliability can be ensured when the maximum quantity of transmissions is four, so that the network device may directly determine, based on a CQI reported by the UE, a quantity of air interface resources and/or the modulation and coding scheme used for the initial transmission. More specifically, the network device may set a threshold, such as two, for the maximum quantity of transmissions. When the maximum quantity of transmissions exceeds the threshold, it is considered that the data transmission reliability can be ensured. When the quantity of transmissions is less than or equal to the threshold, it is considered that the quantity of transmissions cannot ensure the data transmission reliability, so that the quantity of air interface resources may be appropriately increased and/or a code rate of the modulation and coding scheme may be appropriately reduced, thereby improving reliability of a single transmission.

In an example, during each transmission scheduling of the to-be-transmitted data, the network device determines, based on a remaining transmission latency, whether a HARQ retransmission may further be completed after the current transmission. If the HARQ retransmission cannot be completed in the remaining transmission latency after the current transmission, a blind retransmission is arranged after the current transmission. The air interface resource used for the N data transmissions includes air interface resources used for the current transmission and the blind retransmission. Specifically, with reference to the example shown in FIG. 5, if the network device still has time to complete the HARQ retransmission and does not need to arrange the blind retransmission after the initial transmission, the network device delivers, by using the downlink control information, the air interface resource used for the initial transmission and a quantity of transmissions. In this example, the value of N is 1. In addition, the initial transmission of the data is performed at the TTI n+2, and the UE receives and decodes the data at the TTI n+2 based on an indication of the downlink control information. If the decoding is successful, an ACK is fed back, and the network device ends the current data transmission after receiving the ACK message. If the UE fails to decode the data, an NACK is fed back, and after receiving the NACK, the network device delivers, by using the downlink control information, an air interface resource used for a retransmission and information about the value of N again. Specifically, with reference to the example provided in FIG. 5, when performing retransmission scheduling at a TTI n+7, the network device determines that a HARQ retransmission may further be completed in a remaining time. That is, after receiving an ACK/NACK fed back by the UE for data at the TTI n+7, if the network device receives NACK information, the network device may arrange a retransmission again, and the UE may complete on for the re-arranged retransmission within 1 ms. Therefore, the network device allocates only an air interface resource used for the retransmission at the TTI n+7 in the downlink control information, the value of N is set to 1, and the data retransmission is performed at the TTI n+7. The UE receives and decodes the data at the TTI n+7 based on an indication of the downlink control information. If the decoding is successful, an ACK is fed back, and the network device ends the current data transmission after receiving the ACK message. If the UE fails to decode the data, an NACK is fed back, and after receiving the NACK, the network device delivers, by using the downlink control information, the air interface resource used for the retransmission and the information about the value of N again. Specifically, during retransmission scheduling at the TTI n+12, the network device determines that the receive end may complete decoding on the retransmitted data after the retransmission at the TTI n+12, but does not have more time to support the transmit end to receive an ACK/NACK feedback, that is, a HARQ retransmission cannot be further completed in remaining three TTIs. However, the blind retransmission may further be performed at the TTI n+13, and the receive end may complete decoding on the blindly retransmitted data at the TTI n+15 (that is, within 1 ms). Therefore, air interface resources used for the current retransmission and the subsequent blind retransmission are allocated in the downlink control information, the value of N is set to 2, and the data retransmissions are performed at the TTI n+12 and the TTI n+13. The UE receives and decodes the data at the TTI n+12 and the TTI n+13 based on an indication of the downlink control information.

In the embodiment provided in FIG. 5, for a specific manner of allocating the quantity of transmissions and the air interface resource by using the downlink control information, refer to descriptions of the embodiment related to FIG. 4, and details are not described again.

Figure 6:
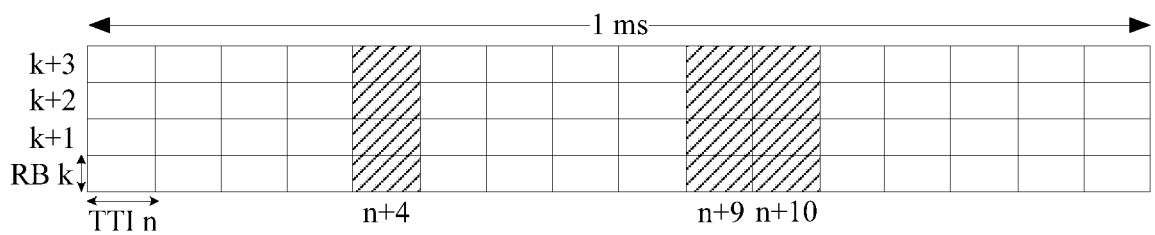
FIG. 6 is a schematic diagram of uplink resource scheduling and allocation according to an embodiment of this application.

FIG. 6 is a schematic diagram of uplink resource scheduling and allocation according to an embodiment of this application.

In the embodiment shown in FIG. 6, assumptions of air interface resource division, a HARQ process, a time required by decoding, a data arrival moment, and a service latency are the same as those in the embodiment shown in FIG. 5, and details are not described again. A difference lies in that, an uplink data transmission is used as an example in the embodiment shown in FIG. 6. A moment at which data is initially transmitted is different from that in the embodiment shown in FIG. 5, and the network device only determines whether a HARQ retransmission may be subsequently completed during (a maximum quantity of transmissions−1)$^{th}$ scheduling.

In an example, when the network device performs initial transmission scheduling on to-be-transmitted data, a maximum quantity of transmissions of the to-be-transmitted data that may be completed within a transmission latency range is determined based on a transmission latency required by a service of the to-be-transmitted data. Specifically, with reference to the example shown in FIG. 6, the network device schedules the UE to initially transmit the to-be-transmitted data at a TTI n+4. After performing the initial transmission at the TTI n+4, the network device may further determines, based on a 1 ms latency limit, four TTI intervals required by a HARQ retransmission, and two TTIs used by the receive end for decoding, that the UE may further be scheduled to perform a HARQ retransmission at a TTI n+9. After the retransmission at the TTI n+9, the receive end may complete decoding on the retransmitted, data that is, the current HARQ retransmission is completed. Then the transmit end may also receive an ACK/NACK feedback for the current HARQ retransmission. However, if a retransmission is scheduled again at a TTI n+14, the receive end cannot complete decoding on the retransmitted data at the TTI n+14 within 1 ms. Therefore, the HARQ retransmission cannot be further completed, but one or more blind transmissions may further be performed from a TTI n+10 to a TTI n+13, and the receive end may complete decoding on the blindly retransmitted data at a TTI n+15 (that is, within 1 ms). Specifically, with reference to the example provided in FIG. 6, the network device determines, based on that only one blind retransmission is arranged, that the maximum quantity of transmissions is three.

In an example, the network device selects, with reference to the maximum quantity of transmissions, an air interface resource and/or a modulation and coding scheme used for the initial transmission. Specifically, with reference to the example provided in FIG. 6, the network device considers that data transmission reliability can be ensured when the maximum quantity of transmissions is three, so that the network device may directly determine, based on a CQI reported by the UE, a quantity of air interface resources and/or the modulation and coding scheme used for the initial transmission. For a more specific implementation, refer to descriptions of the embodiment related to FIG. 5.

In an example, during the (the maximum quantity of transmissions−1)$^{th}$ transmission scheduling, the network device determines, based on a remaining transmission latency, whether a HARQ retransmission may further be completed after the current transmission. If the HARQ retransmission cannot be completed in the remaining transmission latency after the current transmission, a blind retransmission is arranged after the current transmission. The air interface resource used for the N data transmissions includes air interface resources used for the current transmission and the blind retransmission. Specifically, with reference to the example provided in FIG. 6, when performing the retransmission scheduling at the TTI n+9, the network device may know that the current scheduling is the (the maximum quantity of transmissions−1)$^{th}$ scheduling and determine that a HARQ retransmission cannot be further performed in a remaining time. However, the network device may further perform one or more blind retransmissions at the TTI n+10 and a subsequent TTI. In a specific embodiment shown in FIG. 6, the network device arranges a blind retransmission at the TTI n+10, so that air interface resources used for the current transmission and the subsequent blind retransmission are allocated in the downlink control information, and the value of N is set to 2. The UE performs data retransmissions at the TTI n+9 and the TTI n+10 based on a configuration in the downlink control information, and the network device receives and decodes data at the TTI n+9 and the TTI n+10.

In the embodiment provided in FIG. 6, for a specific manner of allocating the quantity of transmissions and the air interface resource by using the downlink control information, refer to descriptions of the embodiment related to FIG. 4, and details are not described again.

Figure 7:
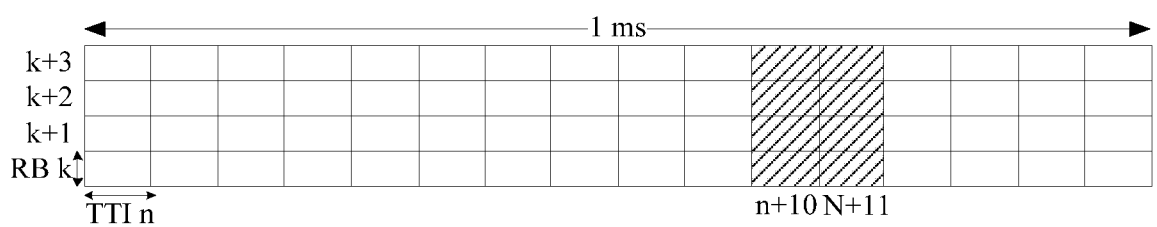
FIG. 7 is a schematic diagram of another downlink resource scheduling and allocation according to an embodiment of this application.

FIG. 7 is a schematic diagram of another downlink resource scheduling and allocation according to an embodiment of this application.

In the embodiment shown in FIG. 7, assumptions of air interface resource division, a HARQ process, a time required by decoding, a data arrival moment, and a service latency are the same as those in the embodiment shown in FIG. 5, and details are not described again. A difference lies in that a moment at which data is initially transmitted in the embodiment shown in FIG. 7 is different from that in the embodiment shown in FIG. 5.

In an example, when the network device performs initial transmission scheduling on to-be-transmitted data, a maximum quantity of transmissions of the to-be-transmitted data that may be completed within a transmission latency range is determined based on a transmission latency required by a service of the to-be-transmitted data. Specifically, with reference to the example provided in FIG. 7, the network device initially transmits the to-be-transmitted data at a TTI n+10. After performing the initial transmission, the network device may determine, based on a 1 ms latency limit, four TTI intervals required by a HARQ retransmission, and two TTIs used by the receive end for decoding, that a next HARQ retransmission may be performed only at a TTI n+15. However, the UE cannot complete decoding on the transmitted data at the TTI n+15 within 1 ms. Therefore, the HARQ retransmission cannot be further completed again after the initial transmission. However, one or more blind retransmissions may be arranged. In the example shown in FIG. 7, the network device determines, based on that only one blind retransmission is arranged, that a maximum quantity of transmission is two.

In an example, the network device selects, with reference to the maximum quantity of transmissions, an air interface resource and/or a modulation and coding scheme used for the initial transmission. Specifically, with reference to the example provided in FIG. 7, the network device considers that data transmission reliability cannot be ensured when the maximum quantity of transmissions is two, so that on a basis that a quantity of air interface resources and/or the modulation and coding scheme used for the initial transmission is determined based on a CQI reported by the UE, the quantity of air interface resources used for the initial transmission may be increased and/or a code rate of the modulation and coding scheme used for the initial transmission may be reduced. For a more specific implementation, refer to descriptions of the embodiment related to FIG. 5.

In an example, during each transmission scheduling of the to-be-transmitted data, the network device determines, based on a remaining transmission latency, whether a HARQ retransmission may further be completed after the current transmission. If the HARQ retransmission cannot be completed in the remaining transmission latency after the current transmission, a blind retransmission is arranged after the current transmission. The air interface resource used for the N data transmissions includes air interface resources used for the current transmission and the blind retransmission. Specifically, with reference to the example provided in FIG. 7, a blind retransmission needs to be arranged after the initial transmission, the network device delivers air interface resources used for the initial transmission and the subsequent blind retransmission and a quantity of transmissions by using the downlink control information. In this example, the value of N is 2. The UE performs the initial transmission and the blind retransmission of the data at the TTI n+10 and a TTI n+11 based on a configuration in the downlink control information, and the network device receives and decodes the data at the TTI n+10 and the TTI n+11.

In the embodiment provided in FIG. 7, for a specific manner of allocating the quantity of transmissions and the air interface resource by using the downlink control information, refer to descriptions of the embodiment related to FIG. 4, and details are not described again.

In still another resource scheduling and allocation method according to an embodiment of this application, user equipment may notify a network device of a service key performance indicator, the network device sends a key performance indicator threshold to the user equipment, and the network device and the user equipment determine, based on the key performance indicator threshold and the service key performance indicator, whether to perform blind retransmission or continuous transmissions. If the blind retransmission or the continuous transmissions are performed, for a specific manner of allocating a quantity of transmissions and an air interface resource in downlink control information, refer to descriptions of the embodiment related to FIG. 4, and details are not described again. Optionally, the key performance indicator threshold may be statically, semi-statically, or dynamically configured. The key performance indicator threshold may be more flexibly configured or updated by semi-statically or dynamically configuring the key performance indicator threshold, thereby flexibly changing a condition for triggering the continuous transmissions. Optionally, the network device may send the key performance indicator threshold to the user equipment by using any one or at least one of physical layer control signaling, Radio Resource Control layer signaling, and Media Access Control layer signaling. Certainly, signaling of another type may further be used. This is not limited in this application. Optionally, the user equipment may notify the network device of the key performance indicator threshold by using any one or at least one of the physical layer control signaling, the Radio Resource Control layer signaling, and the Media Access Control layer signaling. Certainly, signaling of another type may further be used. This is not limited in this application.

In a specific example, the key performance indicator may include a reliability requirement (for example, the reliability requirement is 99.999%), a latency requirement (for example, the transmission latency requirement is 1 ms), and the like. For example, the reliability requirement is used as an indicator for determining whether the blind retransmission or the continuous transmissions are performed. If a currently configured threshold is 99.99%, and reliability required by a current service is 99.999%, the reliability required by the service is higher than the current threshold, so that the reliability requirement of the service is ensured by performing the blind retransmission or the continuous transmissions. For another example, the latency requirement is used as an indicator for determining whether the blind retransmissions or the continuous transmissions are performed. If a currently configured threshold is 2 ms and a latency required by the current service is 1 ms, the latency requirement of the service is ensured by performing the blind retransmissions or the continuous transmissions. Optionally, the key performance indicator may further include an indicator of another service requirement. Alternatively, one or more key performance indicators may be combined to determine whether the blind retransmission or the continuous transmissions are performed. This is not limited in this application.

It should be noted that in the foregoing embodiments, the solutions provided in the embodiments of this application are described based on specific assumptions of a specific air interface resource division manner, a service latency, a HARQ processing latency, a decoding latency, and the like. It may be understood that different air interface resource division manners, and different service latency requirements and different processing latencies in an actual network do not limit the solutions provided in this application. The foregoing content is not uniquely limited in this application.

In addition, the solutions provided in this application may be applied to an uplink transmission or a downlink transmission. The uplink or the downlink in the embodiments are merely for brief description and are not intended to limit the solutions provided in the embodiments of this application.

It may be understood that, to implement the foregoing functions, the network device or the user equipment includes corresponding hardware structures and/or software modules for performing the functions. A person skilled in the art should easily learn that units and algorithm steps of the examples described with reference to the embodiments disclosed in this specification may be implemented by hardware or a combination of hardware and computer software in the present invention. Whether a function is performed by hardware or by computer software driving hardware depends on a particular application and design restraint condition of the technical solutions. A person skilled in the art may use different methods to implement the described functions for each particular application, but it should not be considered that the implementation falls outside the scope of this application.

Figure 8:
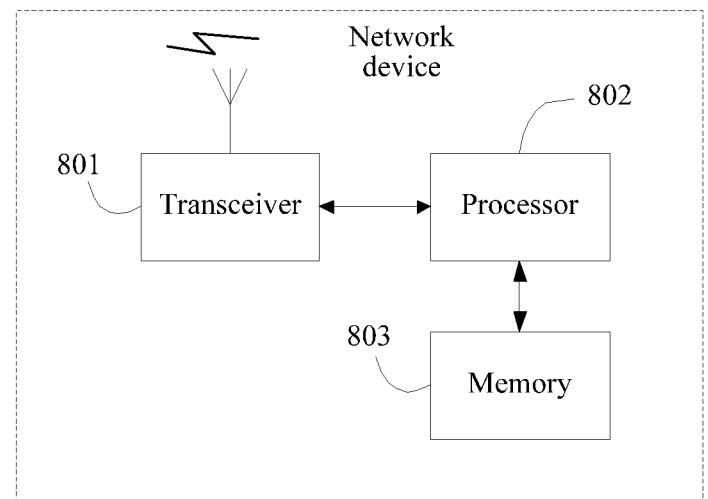
FIG. 8 is a schematic structural diagram of a network device according to an embodiment of this application.

FIG. 8 is a possible schematic structural diagram of a network device in the foregoing embodiments.

In a possible example, a structure of the network device in this application includes a processor and a transmitter. In a possible design, the structure of the network device in this application may further include a receiver.

Specifically, with reference to the example provided in FIG. 8, the network device includes a transceiver 801, a processor 802, and a memory 803. The transceiver 801 is configured to support information sending and receiving between the network device and the UE in the foregoing embodiments, and support radio communication between the UE and another UE. The processor 802 performs various functions for communicating with the UE. In an uplink, an uplink signal from the UE is received by using an antenna, demodulated by the transceiver 801, and is further processed by the processor 802 to restore service data and signaling information that are transmitted by the UE. In a downlink, the service data and the signaling information are processed by the processor 802 and are demodulated by the transceiver 801 to generate a downlink signal, and the downlink signal is transmitted to the UE by using the antenna. The processor 802 further performs a processing process of the network device in FIG. 4 to FIG. 7 and/or another process used for the technology described in this application. The memory 803 is configured to store program code and data of the network device.

It may be understood that FIG. 8 merely shows a simplified design of the network device. In an actual application, the network device may include any quantity of transmitters, receivers, processors, controllers, memories, and the like. All network devices that may implement this application fall within the protection scope of this application.

Figure 9:
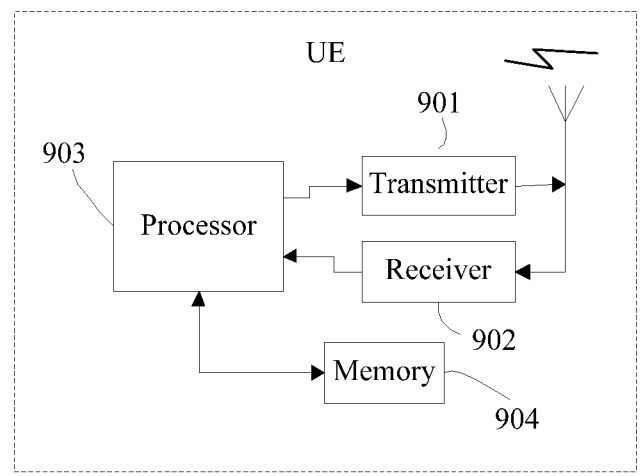
FIG. 9 is a schematic structural diagram of user equipment according to an embodiment of this application.

FIG. 9 is a simplified schematic diagram of a possible design structure of the UE in the foregoing embodiments.

In a possible example, a structure of the user equipment in this application includes a processor and a receiver. In a possible design, the structure of the user equipment in this application may further include a transmitter.

Specifically, with reference to the example provided in FIG. 9, the UE includes a transmitter 901, a receiver 902, a processor 903, and a memory 904.

In an uplink, the transmitter 901 performs adjustments (such as analog conversion, filtering, amplification, and up-conversion) on an output sample and generates an uplink signal. The uplink signal is transmitted to the network device in the foregoing embodiments by using an antenna. In a downlink, the antenna receives a downlink signal transmitted by the network device in the foregoing embodiments. The receiver 902 performs adjustments (such as filtering, amplification, down-conversion, and digitization) on a signal received by using the antenna and provides an input sample. In the processor 903, processing (such as formatting, encoding, and interleaving) is performed on service data and a signaling message. These units perform processing based on a radio access technology (such as access technologies in an LTE system and other evolved systems) used in a radio access network.

The processor 903 is further configured to control and manage an operation of the UE and is configured to perform processing performed by the UE in the foregoing embodiments. For example, the processor 903 is configured to control the UE to receive downlink control information and/or perform, based on the received downlink control information, another process of the technology described in this application. In an example, the processor 903 is configured to support the UE to perform a processing process of the UE in FIG. 4 to FIG. 7 and/or another process of the technology described in this application. The memory 904 is configured to store program code and data that are used for the UE.

Method or algorithm steps described in combination with the content disclosed in this application may be implemented by hardware, or may be implemented by a processor by executing a software instruction. The software instruction may be sent by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made within the spirit and principle of the present invention shall fall within the protection scope of this application.

What is claimed is:

1. A resource scheduling and allocation method, wherein the method comprises:
 obtaining, by a mobile device, an air interface resource that is used for N data transmissions and that is allocated to the mobile device by a network device using a downlink control information, wherein the downlink control information comprises:
  information about the air interface resource used for the N data transmissions; and
  information about a value of N, N being an integer greater than 1, the value of N being in accordance with a maximum quantity of transmissions of to-be-transmitted data that can be completed within a permissible transmission latency time range for a service associated with the to-be-transmitted data, the N data transmissions corresponding to the to-be-transmitted data; and
 transmitting or receiving, by the mobile device, at least a portion of the N data transmissions on the air interface resource configured in the downlink control information.

2. The method according to claim 1, wherein the downlink control information further comprises continuous transmission indication information.

3. The method according to claim 1, wherein the information about the air interface resource further comprises a time domain resource indication of the air interface resource and/or redundancy version (RV) information used for a data transmission.

4. The method according to claim 1, wherein that the downlink control information comprises information about the air interface resource used for the N data transmissions comprises:
 the downlink control information comprises information about an air interface resource used for a first data transmission corresponding to the downlink control information, and an air interface resource used for a remaining data transmission corresponding to the downlink control information is determined based on the information about the air interface resource used for the first data transmission; or
 the downlink control information comprises information about an air interface resource used for each data transmission corresponding to the downlink control information.

5. The method according to claim 1, wherein the N data transmissions comprise:
 at least one retransmission using a hybrid automatic repeat request (HARQ) mechanism; and
 at least one retransmission using a blind retransmission mechanism.

6. A network device, comprising:
 at least one processor configured to:
  determine, based on a permissible transmission latency time range for a service associated with to-be-transmitted data, a maximum quantity of transmissions of the to-be-transmitted data that can be completed within the permissible transmission latency time range;
  allocate, using a downlink control information, an air interface resource used for N data transmissions to a same mobile device, wherein the downlink control information comprises:
   information about the air interface resource used for the N data transmissions; and
   information about a value of N, N being an integer greater than 1, the value of N being in accordance with the maximum quantity of transmissions of the to-be-transmitted data, the N data transmissions corresponding to the to-be-transmitted data; and
 at least one transmitter configured to transmit the downlink control information.

7. The network device according to claim 6, wherein:
 the network device further comprises a receiver, configured to receive the N data transmissions on the air interface resource configured in the downlink control information; or
 the at least one transmitter is further configured to transmit the N data transmissions on the air interface resource configured in the downlink control information.

8. The network device according to claim 6, wherein the downlink control information further comprises continuous transmission indication information.

9. The network device according to claim 6, wherein the information about the air interface resource comprises a frequency domain resource indication of the air interface resource.

10. The network device according to claim 6, wherein the information about the air interface resource further comprises a time domain resource indication of the air interface resource and/or redundancy version (RV) information used for a data transmission.

11. The network device according to claim 6, wherein that the downlink control information comprises information about the air interface resource used for N data transmissions comprises:
 the downlink control information comprises information about an air interface resource used for a first data transmission corresponding to the downlink control information, and an air interface resource used for a remaining data transmission corresponding to the downlink control information is determined based on the information about the air interface resource used for the first data transmission; or
 the downlink control information comprises information about an air interface resource used for each data transmission corresponding to the downlink control information.

12. The network device according to claim 6, wherein:
 at least one of the N data transmissions is a retransmission; and
 determining the maximum quantity of transmissions of the to-be-transmitted data that can be completed within the permissible transmission latency time range is further based on two or more retransmission mechanism options.

13. A mobile device, comprising:
 at least one receiver configured to receive downlink control information transmitted by a network device; and
 at least one processor configured to obtain an air interface resource that is used for N data transmissions and that is allocated to the mobile device by the network device using the downlink control information, wherein the downlink control information comprises:
  information about the air interface resource used for the N data transmissions; and information about a value of N, N being an integer greater than 1, the value of N being in accordance with a maximum quantity of transmissions of to-be-transmitted data that can be completed within a permissible transmission latency time range for a service associated with the to-be-transmitted data, the N data transmissions corresponding to the to-be-transmitted data.

14. The mobile device according to claim 13, wherein:
the mobile device further comprises a transmitter, configured to transmit the N data transmissions on the air interface resource configured in the downlink control information; or
the at least one receiver is further configured to receive the N data transmissions on the air interface resource configured in the downlink control information.

15. The mobile device according to claim 13, wherein the downlink control information further comprises continuous transmission indication information.

16. The mobile device according to claim 13, wherein the information about the air interface resource comprises a frequency domain resource indication of the air interface resource.

17. The mobile device according to claim 13, wherein the information about the air interface resource further comprises a time domain resource indication of the air interface resource and/or redundancy version (RV) information used for a data transmission.

18. The mobile device according to claim 13, wherein that the downlink control information comprises information about the air interface resource used for the N data transmissions comprises:
the downlink control information comprises information about an air interface resource used for a first data transmission corresponding to the downlink control information, and an air interface resource used for a remaining data transmission corresponding to the downlink control information is determined based on the information about the air interface resource used for the first data transmission; or
the downlink control information comprises information about an air interface resource used for each data transmission corresponding to the downlink control information.

19. The mobile device according to claim 13, wherein the N data transmissions comprise:
at least one retransmission using a hybrid automatic repeat request (HARQ) mechanism; and
at least one retransmission using a blind retransmission mechanism.

* * * * *